United States Patent
Alvarez et al.

(10) Patent No.: US 6,172,718 B1
(45) Date of Patent: Jan. 9, 2001

(54) ADAPTIVE DYNAMIC APERTURE CORRECTION

(75) Inventors: José R. Alvarez, Sunnyvale; William S. Herz, Newark, both of CA (US)

(73) Assignee: S3 Incorporated, Santa Clara, CA (US)

( * ) Notice: Under 35 U.S.C. 154(b), the term of this patent shall be extended for 0 days.

(21) Appl. No.: 09/061,725

(22) Filed: Apr. 17, 1998

(51) Int. Cl.[7] .................................................... H04N 5/21
(52) U.S. Cl. .......................... 348/625; 348/606; 382/263; 382/266
(58) Field of Search ..................................... 348/625, 606, 348/627, 628–631, 447, 910, 607; 382/266–269, 263, 261, 260; H04N 5/21

(56) References Cited

U.S. PATENT DOCUMENTS

| 3,789,133 | * | 1/1974 | Kline ..................... 348/625 |
| 4,223,339 | * | 9/1980 | Lagoni et al. .............. 348/625 |
| 4,559,558 | * | 12/1985 | Hosoya et al. ............. 348/625 |
| 5,910,820 | * | 6/1999 | Herz et al. ............... 348/446 |

* cited by examiner

*Primary Examiner*—Michael Lee
(74) *Attorney, Agent, or Firm*—Fenwick & West LLP (57) ABSTRACT

Aperture correction or edge detection circuitry filters input data for high-frequency components, and then selects areas most likely to be text based on the contrast of the signal and applying an amount of aperture correction responsive to the signal characteristics. A high pass filter (116) is employed to filter out low frequency components and separate the signal into positive and negative going transitions. Then, the positive-going signal is coupled to a contrast detector (124), which produces a control signal that controls the amount of aperture correction added to the signal by an aperture correction circuit 112. The contrast detector (124) is designed to generate an amount of aperture correction that is responsive to the high frequency content of the positive-going signal.

In one embodiment, a global threshold is used that allows aperture correction to be applied to the input signal only if the amplitude of the high frequency component of the signal is greater than the threshold. This prevents the unnecessary application of aperture correction for lower-contrast signals. In another embodiment, a second contrast detector (128) is employed to generate inverse aperture correction in response to the negative-going component of the input signal. This inverse aperture correction control signal is transmitted to the aperture correction and is employed in situations when the signal is transitioning from white to black. The present invention is applicable to the luminance or chrominance components of a graphics signal, and may be applied in conjunction with either horizontal or vertical picture detail with equal effectiveness.

23 Claims, 8 Drawing Sheets

ADAPTIVE DYNAMIC APERTURE CORRECTION

BACKGROUND OF THE INVENTION

1. Field of the Invention

This invention relates generally to processing of computer graphics for display on a television, and more particularly, to aperture correction for computer graphics.

2. Description of the Related Art

As the result of the continuous development of new technologies, the distinction between computers, in particular computer monitors, and televisions is becoming increasingly blurred. In other words, the computer and television industries are converging. For example, computer networks such as the Internet and the World Wide Web used to be almost exclusively a computer phenomena. Now, however, televisions may also be used to access these networks. As another example, broadcast entertainment used to belong squarely in the television domain. Now, however, many service providers are offering entertainment to computer users through computer networks. As a result of this convergence, there is a need to display computer graphics originally intended for computers on televisions.

The Need for Flicker Filtering

Televisions and computers, however, generally use incompatible graphics formats. For example, many formats for computer monitors and flat-panel displays are non-interlaced. In other words, the entire frame of computer graphics is updated at once. In contrast, many common television formats are interlaced, meaning that the frame is divided into odd and even fields and only one field or half the frame is updated at a time. As a result, in order to display computer graphics on a television, the computer graphics often must be converted from a non-interlaced to an interlaced format. This conversion typically includes dropping lines of the display. However, this introduces undesirable visual effects as a result of the conversion from a non-interlaced to an interlaced format.

In addition to the conversion process, typical systems also perform flicker filtering to improve the image quality. Two common types of flicker filtering are 2-tap and 3-tap filtering, in which either two or three non-interlaced lines are combined to form each interlaced line. Some attempts have been made to use vertical filters to limit the frequencies that will cause flicker when the progressively scanned (non-interlaced) image is converted to the interlaced format. Increasing the number of taps in the filters provides better frequency selection in eliminating the frequency components that cause flicker. However, having a large number of taps increases the complexity and cost of the flicker-filtering circuit. Additionally, although flicker-reduction filtering effectively improves flicker artifacts, it can also reduce vertical picture resolution if the filter implemented does not have sharp transfer characteristics. In order to prevent flicker on television displays, the computer graphics picture must be properly band limited in the vertical direction as to obey the Nyquist limit. This reduction of resolution is most apparent in text since text is likely to have high vertical frequency detail.

The Need for Picture Aperture Correction

Graphic accelerators that implement flicker filter reduction for the conversion of computer desktop graphics into television signals are likely to use simple vertical filter structures due to integrated circuit area and resource limitations. In order to overcome the lack of resolution after flicker-filtering, a system has been developed as described in U.S. Pat. No. 5,910,820, entitled "Correction of Flicker Associated With Non-Interlaced-To-Interlaced Video Conversion", hereby incorporated by reference, to improve text and other picture detail. This system improves picture detail by using aperture correction for enhancing the contrast of the picture. Aperture correction refers to the process of improving picture quality by changing the relative signal levels of the luminance (Y) signal or chrominance (C) signals derived from an original RGB (red, green, blue) encoded pixel. Luminance (Y) is a measure of the brightness of a pixel. Chrominance (C) is a measure of the color information of a pixel.

As described in the aforementioned patent application, aperture correction is based on three threshold values:

ACh: High threshold value
ACm: Medium range threshold value
ACl: Low range threshold value There are three luminance regions defined in the range of values. Aperture correction increases the values of all inputs in the upper region, decreases the values in the lower region, and changes the values in the middle region, based on the following algorithm:

if Y>=ACh then Yout Y+AC else
if Y<ACh and Y>=ACm then Yout Y−AC else
if Y<ACm and Y>=ACl then Yout=Y+AC else
if Y<ACl then Yout=Y−AC For inverse aperture correction, the value of AC becomes negative.

The purpose of using aperture correction on images is to improve the appearance of positive-going high contrast images, such as black text on a white background. The reverse process is termed inverse aperture correction, and its purpose is to improve the appearance of negative-going high contrast images, such as white text on a black background. The word improvement in this context means a better picture as perceived by a typical observer. Typically, aperture correction works as any other global luminance enhancement mechanism and once the parameters are set, they cannot be changed on a pixel-by-pixel basis.

The value to be added or subtracted from the input luminance Y signal is labeled AC and it can be any quantity in the range of values. However, to improve the signal, this value must be carefully selected in order not to affect, degrade or totally obliterate the input. Otherwise, the result of the current process is an image which appears slightly unnatural, because not only are images which are supposed to have high contrast highly contrasted, images that are more muted in contrast will appear highly contrasted. A user could manually adjust the amount of contrast for each frame, but that reduces the commercially practical usefulness of using aperture correction, because only users knowledgeable about the compromises and consequences of setting the parameters to the correct values would be able to use the device. Additionally, a user can spend a considerable amount of time trying to find the optimum values for a class of images only to find out that the parameters do not hold with other types of material. Thus, the user is forced to constantly readjust the circuit. Thus, there is a need for a system which can dynamically and adaptively add aperture correction only to those parts of an image frame that need it, specifically, the parts of the image containing text.

SUMMARY OF INVENTION

The present invention modifies existing aperture correction or edge detection circuitry by first filtering the input data for high-frequency components, and then selecting areas most likely to be text, based on the contrast of the signal and applying an amount of aperture correction responsive to the signal characteristics. In the preferred embodiment, a high pass filter (116) is employed to filter low frequency components, and separate the signal into positive and negative going transitions. Then, the positive-going signal is coupled to a contrast detector (124), which produces a control signal that controls the amount of aperture correction added to the signal by an aperture correction circuit. The contrast detector (124) is preferably designed to generate an amount of aperture correction that is responsive to the high frequency content of the positive-going signal. In one embodiment, a global threshold is used that allows aperture correction to be applied to the input signal only if the amplitude of the high frequency component of the signal is greater than the threshold. This prevents the unnecessary application of aperture correction for lower-contrast signals. In another embodiment, a second contrast detector is employed to generate inverse aperture correction in response to the negative-going component of the input signal. This inverse aperture correction control signal is transmitted to the aperture correction and is employed in situations when the signal is transitioning from white to black. The present invention is applicable to the luminance or chrominance components of a graphics signal, and may be applied in conjunction with either horizontal or vertical picture detail with equal effectiveness.

BRIEF DESCRIPTION OF THE DRAWINGS

FIG. 4b is a graph showing the frequency response of the filter of FIG. 4a.

DETAILED DESCRIPTION OF THE PREFERRED EMBODIMENTS

Figure 1:
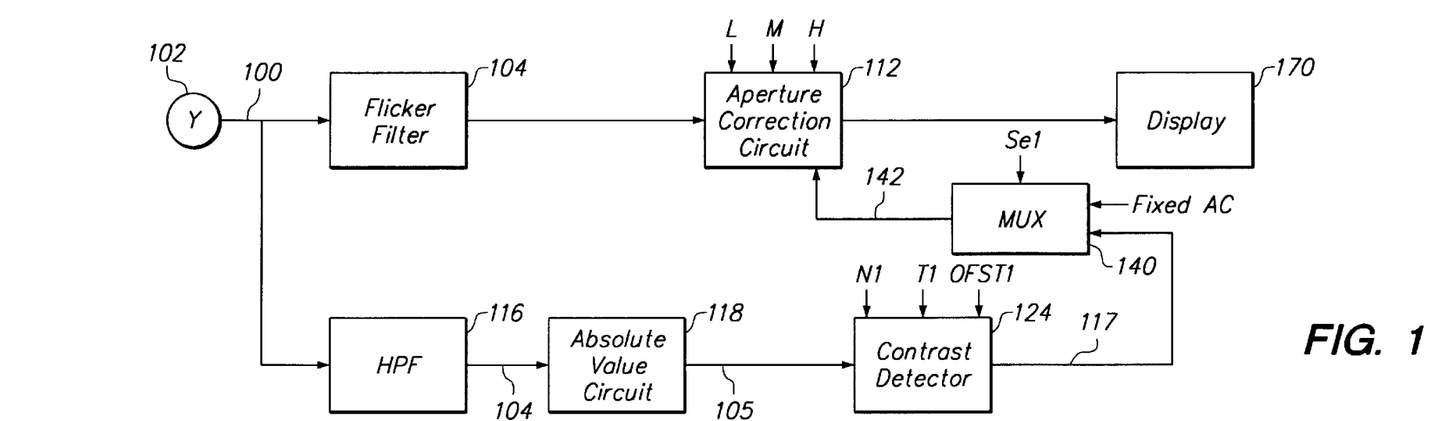
FIG. 1 is a block diagram of the preferred embodiment of the present invention.

The preferred embodiment of the present invention is depicted in FIG. 1. The signal flow starts with the input data 100 being transmitted from a data source 102. In a preferred embodiment, the data source 102 is a multiplexer that may select from a number of different data sources, including a frame buffer, which are typically components of a computer system. In an exemplary embodiment, the components illustrated in FIG. 1 are located on a graphics controller chip such as a Trio 64V+or ViRGE graphics controller chip made by S3 Incorporated of Santa Clara, Calif. Additionally, in a preferred embodiment, the input data 100 from the data source is digital data in YUV format. The Y component is the luminance component of an image and the U and V components are typically referred to as the chrominance component of an image. Typically, an embodiment having a 24-bit bus, 8 bits are used for Y, and 16 bits for U and V. The image data is then transmitted to a flicker filter 104, which performs in the manner described in the background above. After flicker filtering, the is signal is transmitted to the aperture correction circuit 112 where aperture correction is applied. The image data is subsequently converted to an NTSC or PAL encoded signal, or any other suitable encoding.

In one embodiment, there are two vertical flicker filter structures 104 that can be selected externally. Each structure implements a different characteristic that is selected on a frame-by-frame basis. The selection of different sets of flicker filters 104 allows changing the overall performance by setting the amount of flicker reduction in the vertical domain. The output of either filter structure is selected and routed to the input of the aperture correction processing circuit 112. In the preferred embodiment, a flicker filter 104 as described in the aforementioned U.S. Pat. No. 5,910,820 is used, which is hereby incorporated by reference. In such an embodiment, each structure could use a filter as described in U.S. Pat. No. 5,910,820, but using a different number of taps.

The preferred aperture correction system 112 is detailed in patent Ser. No. 08/621,567 and is described in the background above. However, the principles of present invention may be applied to the preferred aperture correction system using any number of different thresholds. For example, if only one threshold is used, for example, ACh, instead of three, correction may be added to the luminance only if the AC threshold has been exceeded. The embodiments set forth herein are described as to how the amount of aperture correction to use in conjunction with the aperture correction system of U.S. Pat. No. 5,910,820 is calculated, but one skilled in the art could apply the principles described herein to a different aperture correction system, for example, with a generic edge enhancement control circuit which employs an input parameter that varies the amount of contrast applied to the image.

Figure 2A:
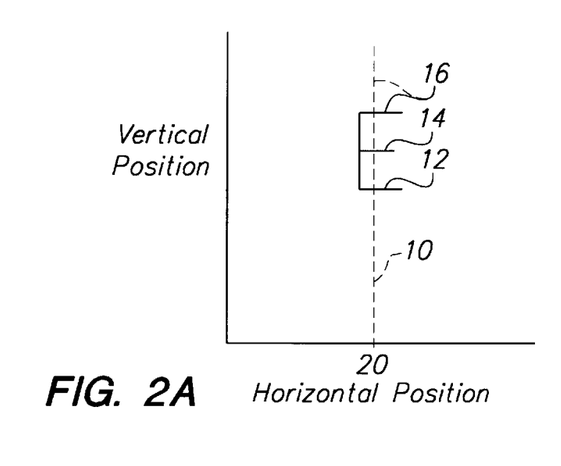
FIG. 2a shows an example of an image of the letter "E" to be processed for display in an interlaced format.
Figure 2B:
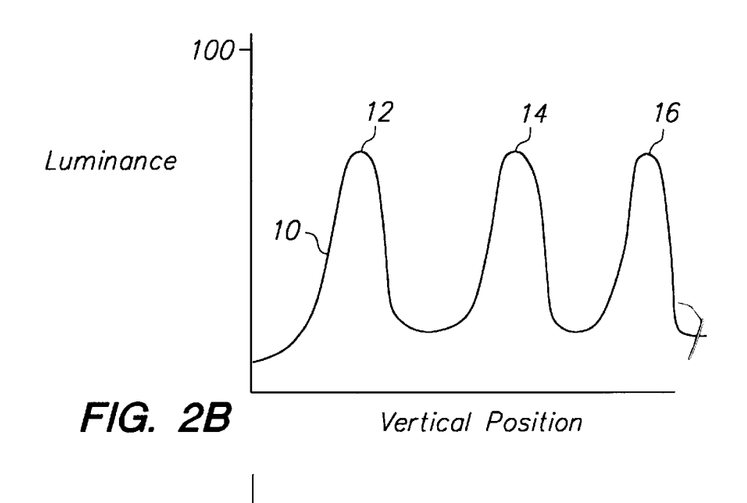
FIG. 2b is a graph of a selected line in vertical position vs. luminance
Figures 2C, 2D:
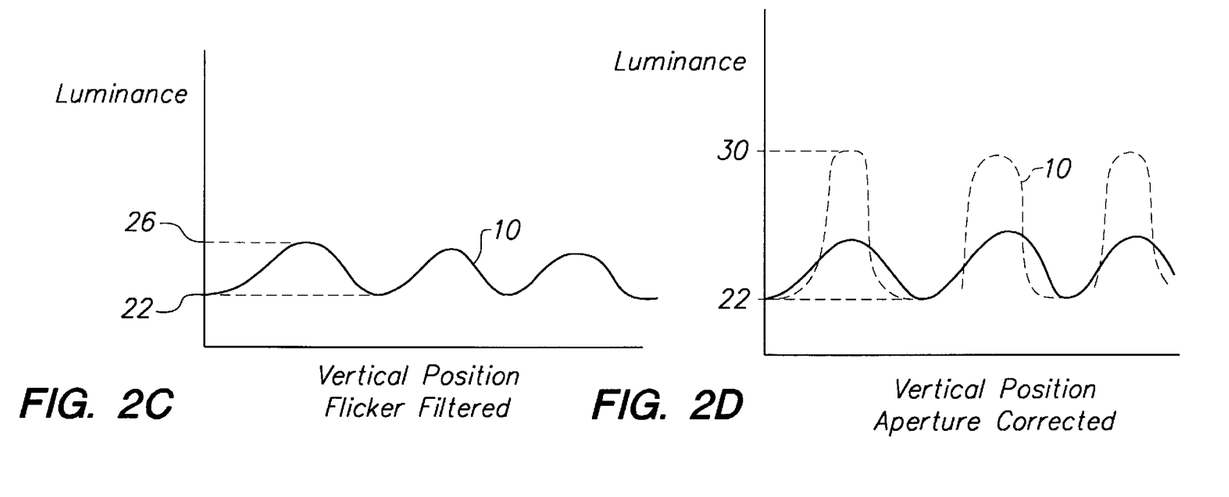
FIG. 2c is a graph of the line of FIG. 2b after being flicker filtered.
FIG. 2d is a graph of the line of FIG. 2c after being aperture corrected.

If aperture correction is applied to the entire image, as in conventional systems, the result is an image with luminance discontinuities that may manifest as banding if the fixed thresholds are set incorrectly for the class of image being displayed. For instance, if the thresholds were meant for images with text, then other images such as images from a movie may show unnatural contours which are otherwise quite valid for text. For example, FIG. 2a shows an image of the letter "E". In the example of FIG. 2a, the image of the letter E has a maximum luminance of 100 at three vertical positions 12, 14, 16, at horizontal position 20. One vertical line 10 of the image "E" has been selected. FIG. 2b shows line 10 on a graph of vertical position versus luminance. The luminance of the image sharply rises at the three points 12, 14, 16 along the vertical line 10 that intersects a portion of the letter "E" and sharply decreases at other points. FIG. 2c shows an example of the same image signal 10 that has been flicker filtered. Note how the signal 10 is broadened, the difference between the peak luminance 20 and the background luminance level 22 is now much less than it was. This decrease in difference will result in a blurry picture, as the letter E will appear to fade into the background 22. FIG. 2d shows the signal 10 after it has been aperture corrected using the correct amount of aperture correction. The aperture correction has increased the amplitude of and narrowed the peaks 30 of the signal 10, restoring the proportionality of the signal strength of the "E" and the background 22. This will result in a sharper E, as the edges of the E will appear in greater contrast to the background 22.

Figure 3A:
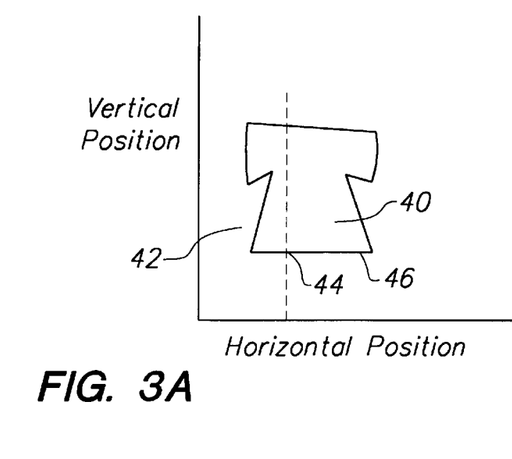
FIG. 3a shows an illustration of a shirt image to be processed for display in an interlaced format.
Figure 3B:
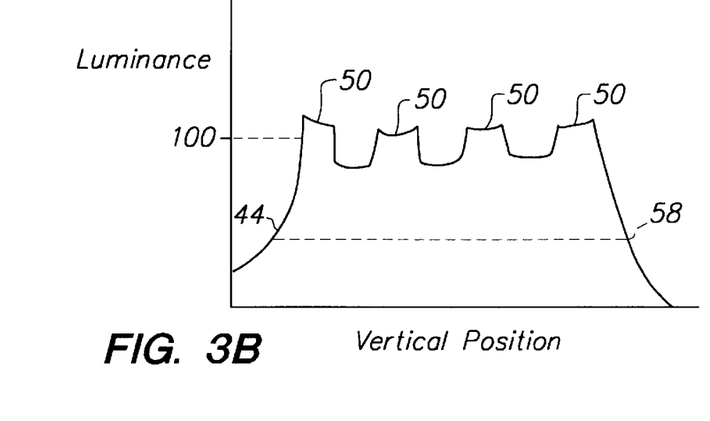
FIG. 3b is a graph of a selected line of the shirt image of FIG. 3a in vertical position vs. luminance.
Figure 3C:
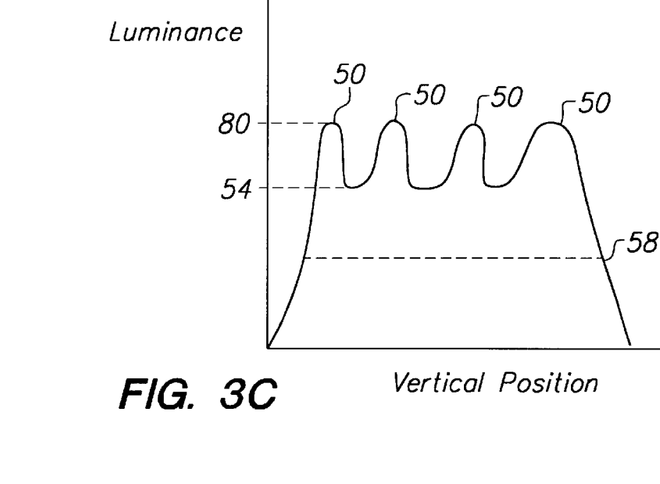
FIG. 3c is a graph of the line of FIG. 3b after flicker filtering.

FIG. 3a shows an example image of a solid, light-colored shirt 40 in a dark background 42. A vertical line 44 of the image 40 has been selected. FIG. 3b shows the vertical line 44 in a graph of vertical position versus luminance. The luminance of value of the selected line 44 rises where the background 42 becomes the shirt edge 46. The signal 44 has small fluctuations 50, because the shirt image 40, although one color, has variations due to wear or other phenomena that have a change in luminance values. The fluctuations 50 are not enough to be noticeable to the typical viewer of the image 40. FIG. 3c shows the signal 44 after being flicker filtered. The amplitude 54 of the signal 44 representing the shirt 40 is closer to the amplitude of the background 58, and the amplitude of the fluctuations 50 has remained the same, relative to the amplitude of the shirt 40. Since a shirt image 40 does not require precision to be perceived, the merging of the shirt image 40 into the background 58 is not noticeable.

Figure 3D:
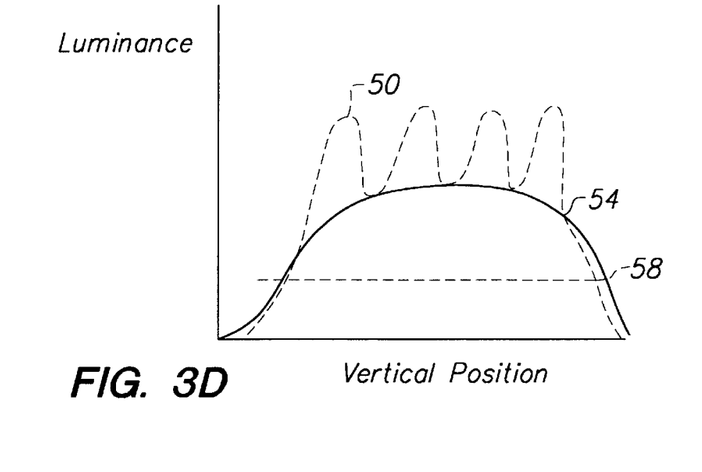
FIG. 3d is a graph of the line of FIG. 3c after aperture correction.

FIG. 3d shows the effect of aperture correction applied to the shirt image 40 using thresholds that have been preset for text. The shirt edges 46 are sharply contrasted to the background, offering a clearer outline of the shirt. However, the minor fluctuations 50 within the shirt are also exaggerated. This creates a picture with unnatural bright spots, and tends to appear odd to the viewer. Advantageously, embodiments employing the principles of the present invention, apply aperture correction dynamically, such that the shirt image 40 and the letter "E" have the correct amount of aperture correction applied. Thus, the shirt image 40 can be seen clearly against the background, but still appears to be a solid shirt, and the letter "E" continues to appear in sharp contrast to its background 22.

Figure 4A:
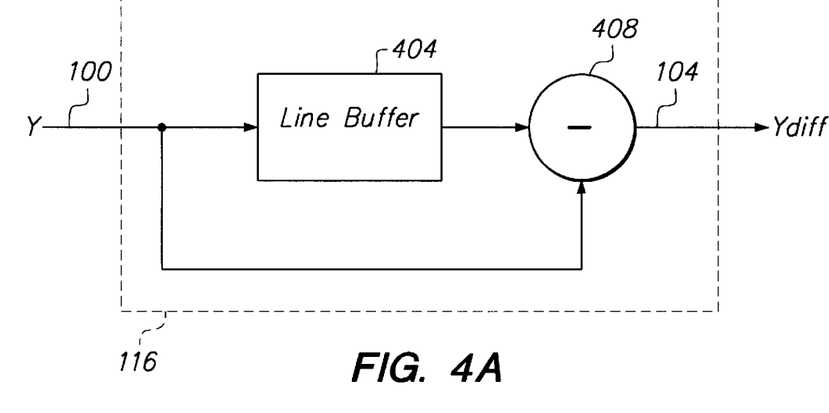
FIG. 4a is a block diagram showing details of high pass filter 116 of FIG. 2.

Referring back to FIG. 1, the input signal 100 containing the Y component of the YUV data is processed by a high pass filter 116 which is implemented as a simple differentiator circuit, as shown in FIG. 4a. The input Y component 100 of the YUV data is coupled to a line buffer 404. The line buffer 404 serves to store a line of data, for example, L1. For a vertical high pass filter 116, which operates on differences in luminance between two horizontal lines, the input to the filter 116 is signal data comprising horizontal lines. For a horizontal high pass filter 116, which operates on differences in luminance between two adjacent pixels, the input to the filter is in the Y components of pixels. Either filter 116 may be used in accordance with the principles of the present invention. However, for convenience, the majority of the description below is given in terms of a vertical high pass filter 116. One skilled in the art would realize that the principles described herein are applicable to either horizontal or vertical picture detail.

Figure 4B:
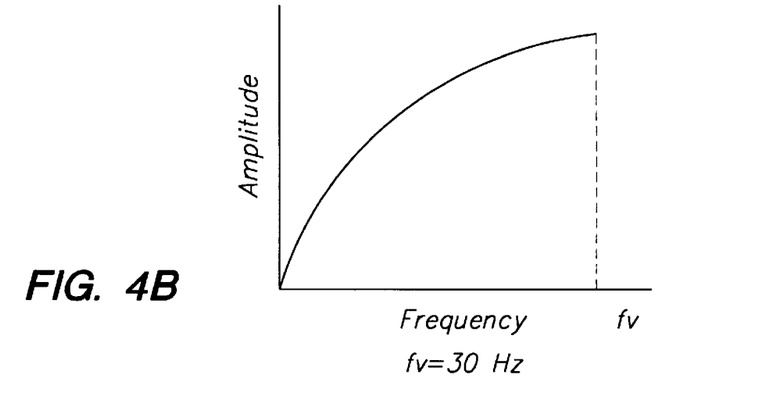

The output of the line buffer 404 is coupled to a subtractor 408. The other input of the subtractor 408 is the input data 100 consisting of a next horizontal line of pixel data. Thus, the output 104 of the subtractor 408, Ydiff, when Line 1 (L1) and Line 2 (L2) are transmitted is the difference in luminance between L2 and LI (L2−L1). When Lines 3 and 4 are transmitted, the output 104, Ydiff, is L4−L3, and so on. For eight lines (L1−L8), Ydiff 104 will have four values and value corresponding to a difference between two adjacent horizontal lines, L2−L1, L4−L3, L6−L5, and L8−L7. The spectral output of the circuit is shown in FIG. 4b, with Fv being the Nyquist frequency for the system. Using high pass filter 116 is effective because sharp transitions in the luminance value are represented by areas of high frequency in the frequency domain. Text is the type of image that usually has the sharpest edges and the sharpest transitions in luminance values, and thus it is the part of the image with the highest frequency content in the frequency domain. As the flicker filter 108 essentially discards the high frequency content of the signal, text is the part of the image that is most affected by flicker filtering. The goal of the high pass filter 116, therefore, is to regain the edge information discarded by the flicker filter 108. In the preferred embodiment, this is accomplished by using the filter characteristics of [½, −½]. The application of the preferred filter 116 results in the output of the filter 116 being one half of the difference of the two inputs to the filter 116. For example if the luminance value of a first pixel in L1 is 20 and the luminance value of the corresponding pixel in L2 is 10, then the output of the filter is (10−20)×½ or, −5.

However, other filters 116 can be chosen to match a particular input signal more precisely. For example, a filter 116 having the characteristics of (1−Sf), where Sf is the amplitude of the input signal after being flicker filtered, should exactly represent the information lost by flicker filtering. This may regain unnecessary information, however, which is why in the preferred embodiment the filter with characteristics of [½, −½] is used. In the above example with the letter "E", the edges of the letter "E" would be passed by the high pass of filter 116 and therefore displayed because the sharp edges would produce high frequencies in the frequency domain. In the example of the shirt image in FIGS. 3a−3d, the edge of the shirt image would be displayed, and the fluctuations may or may not be passed, depending on their shape. The other information regarding the shirt would not be passed by the high pass filter 116. Alternate embodiments of the high pass filter 116 of FIG. 4a may also be employed in accordance with the present invention, such as using a filter 116 with characteristics of [−½, ½].

Turning back to FIG. 1, the output 104 of the high pass filter (HPF) 116 is coupled to a conventional absolute value circuit 118. The absolute value circuit 118 takes the absolute value of the signal 104 by techniques known in the art. The output of the absolute value detector 118, Ydiff 105, is transmitted to a contrast detector 124. Contrast detection is needed because the signal at the output of the high pass filter 116 cannot be considered a true indication of vertical edges, since there are other signal features like noise or picture content that are also passed by the high pass filter 116. The contrast detector 124 serves as a dynamic selector as to which areas of high frequency detail aperture correction must be applied and in what quantities the aperture correction value must be applied. The contrast detector 124 gradually increases the aperture correction depending on the content of signal 105 of high frequency components. For example, a high contrast text edge will produce a high input value to the contrast detector 124 and the contrast detector 124 will respond by giving the greatest degree of enhancement to that transition, while lower contrast data produce smaller amounts of aperture correction. This is critical for image viewing, because sudden application of a maximum amount of aperture correction results in an odd image for most viewers, as discussed above. However, in accordance with the present invention, aperture correction is added gradually, and the resulting image appears sharp without having the odd artifacts generated by prior art aperture correction systems. The usefulness of the contrast detector 124 is that it helps determine adaptively what constitutes a text edge, however, edges of all graphical images are also enhanced.

Figures 5A, 5B, 5C:
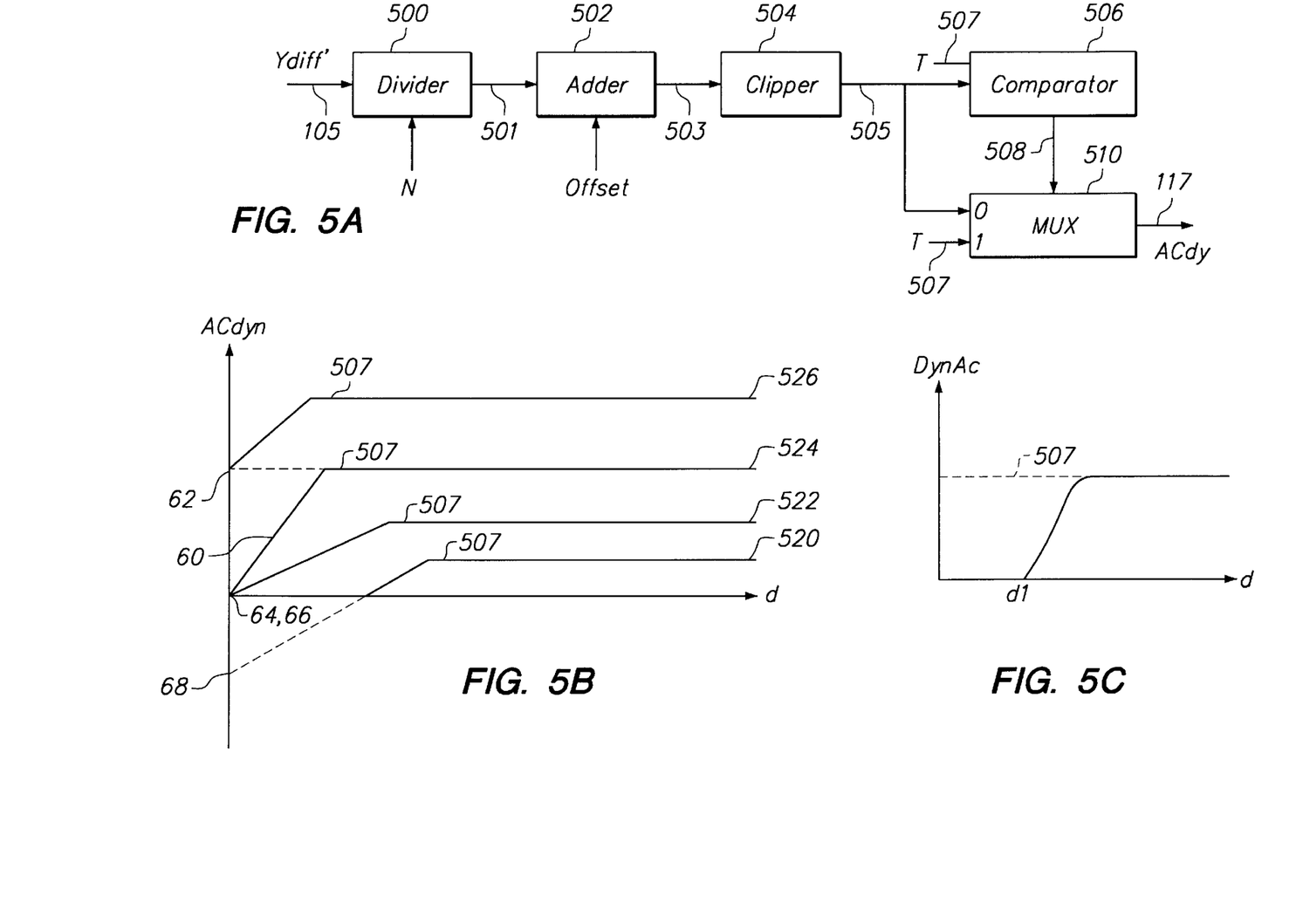
FIG. 5a is a block diagram showing details of contrast detector 124 of FIG. 1.
FIG. 5b is a graph of a preferred non-linear transfer function in accordance with the present invention, and alternate embodiments of the non-linear transfer function.
FIG. 5c is a graph of a first alternate non-linear transfer function in accordance with the present invention.

In the preferred embodiment, the contrast detector 124 is a circuit implementing a non-linear transfer function. One implementation of the contrast detector 124 is illustrated in FIG. 5a. A divider 500 is coupled to the output 105 of the absolute value circuit 118. A constant value, N, is also coupled to the divider 500. The divider 500 divides the input signal 105 by the constant value N. The constant N is chosen to give a desired characteristic for the nonlinear transfer function by controlling its slope. The slope controls the rate at which aperture correction is added based upon the amplitude of the input signal. Sample curves which implement the equation AC=Ydiff/N+Offset are illustrated in FIG. 5b. These parameters, N and Offset, may be implemented as hardware, software, or firmware. The software embodiment is discussed in greater detail below. The curve characteristic is chosen to generate a different amount of aperture correction depending upon the amplitude of the Y component of the graphics signal, typically generating less when the amplitude is less and more when the amplitude is more. However, the relationship is not linear. Rather, as shown by the preferred embodiment of curve 522 in FIG. 5b, there is very little aperture correction generated for lower values to mid-range values, such as 0–16, and then after this region, a much greater amount of aperture correction is applied. After the amplitude of the input signal 105 reaches a certain threshold, the contrast detector 124 generates a control signal 509 which enables the maximum amount of aperture correction possible. This is indicated in FIG. 5b by the flattening curve.

The output of the divider 500 is preferably coupled to an adder 502 which adds an offset value to the output 501 of the divider 500. The offset is user-selectable, and controls the minimum amount of aperture correction to be added to the input signal 501. The output 503 of the adder 502 is provided to a clipper 504. The clipper 504 is used in an embodiment without an absolute value circuit 118, to clip any negative component to the signal. Negative values may produced as a result of the choice of the offset value. For example, if the offset is chosen to be a negative value, then the output of the adder 502 may have negative values. These must be clipped, as illustrated by curve 520 in FIG. 5b, since the values for the subsequent components of the circuit should always be positive.

The output 505 of the clipper 504 is provided to a comparator 506 and a multiplexer 510. The comparator 506 compares the amplitude of the clipped signal 505 to a threshold value 507. This threshold value 507 is the maximum amount of aperture correction that may be added by the aperture correction circuit 112. If the amplitude of the clipped signal 505 is greater than the threshold 507, then a binary value of one is transmitted to the multiplexer 510 as a control signal 508. Otherwise, a binary value of zero is transmitted to the multiplexer 510.

The multiplexer 510 receives the output 505 of the clipper 504, the threshold 507, and the control signal 508 from the comparator 506. If a binary one is received from the comparator 506, the multiplexer 510 selects and transmits the threshold signal 507 as output signal 117. Otherwise, the clipped signal 505 is transmitted to the aperture correction circuit 112 as output signal 117. One skilled in the art would realize that the above circuit may be implemented in different ways and still be within the scope of the invention. For example, the binary one could be assigned if the output of the clipper 505 is less than the threshold 507, or the multiplexer 510 may respond transmit the threshold 507 in response to a zero instead of a one.

The curves illustrated in FIG. 5b have different characteristics and therefore different effects on images. For example, curve 520 has a negative offset, which has the effect of clipping the curve before the origin. In image terms, this means that for signals of high frequency which are below a certain amplitude, no aperture correction is applied at all. Also, the threshold 507 for curve 520 is relatively low, which means that the maximum amount of aperture correction that may be applied to an image is a small amount. Additionally, the threshold 507 is only reached for higher Ydiff values 105, which means that in general more pixels 105 receive less aperture correction. Therefore, a contrast detector 124 implementing curve 520 is useful for classes of images which do not require much aperture correction and do not require any correction for lower amplitude signals.

Curve 522, discussed above, has a more gradual application of aperture correction in relation to the amplitude of the input signal 105. Curve 522 has an offset of zero, which means that all signals 105 receive some aperture correction, although the lower amplitude signals do not receive very much aperture correction. The threshold 507 is higher than curve 522, which means the maximum amount of aperture correction which may be applied is more than for curve 522. However, the threshold 507 occurs at the same amplitude value, which means, as was the case for curve 520, that more lower amplitude signals do not receive the maximum amount of aperture correction allowed for by this function.

Curve 524 has a steep slope 60, caused by the value of N chosen for it. This means that aperture correction is added dramatically as the amplitude of the input signal 105 rises. Also, the maximum amount of aperture correction is high due to the setting of its threshold 507. All signals 105 receive some aperture correction, since the offset is zero, although the lower amplitude signals 105 receive a small amount of aperture correction.

In contrast, curve 525 has a positive offset, which means that all signals 105 receive a more significant amount of aperture correction. The threshold 507 is close to the origin, which means that more signals 105 will be receiving the maximum amount of aperture correction. The maximum amount is quite high, so this embodiment is more useful for images which require a great deal of aperture correction.

Figure 5D:
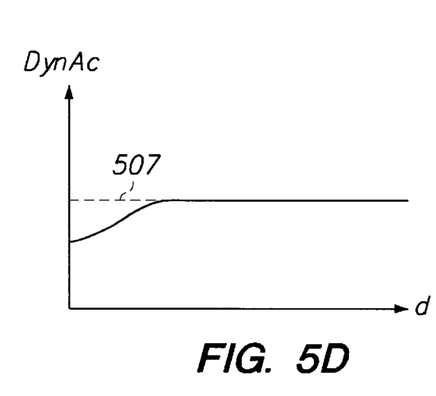
FIG. 5d is a graph of a second alternate non-linear transfer function in accordance with the present invention.
Figure 5E:
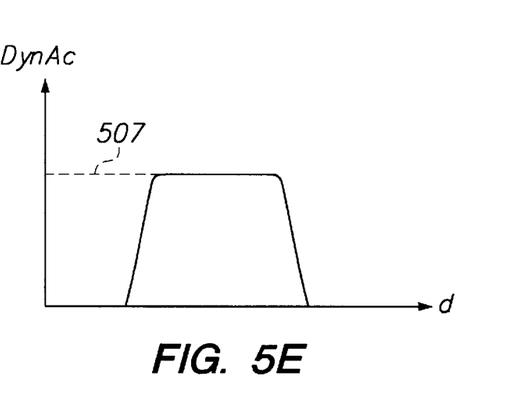
FIG. 5e is a graph of a third alternate non-linear transfer function in accordance with the present invention.

FIGS. 5c–e depict non-linear transfer functions which are more useful for different types of images, all of which may be implemented by circuits using similar components as those in FIG. 5a. FIG. 5c enhances high frequencies which have amplitudes greater than a threshold, d1. This may be used to enhance schematic diagrams or blueprints which have high contrast edges and transition in contrasting colors. The transfer characteristic shown in FIG. 5d exhibits a small threshold 507 compared to the overall aperture correction range. This may be used to enhance information synthetically generated but which requires some blurring in low frequencies and some small dynamic enhancement through all frequency spectrum. A digitally generated map is an example of a class of image which would benefit from this type of enhancement. FIG. 5e shows a transfer function that selects a range of higher frequencies to enhance. The high frequencies with mid-level contrast are enhanced, whereas low and high contrast frequencies are untouched. This is useful to enhance computer generated special effects where the subtle textures on surfaces and the very high contrast edges are not meant to be affected, while the mid-level regions require additional detail. Each non-linear transfer function is best suited for a particular class of images. Once a non-linear transfer function is selected, however, any image in that class is optimally processed by the selected curve.

The key relationship used in embodiments employing the principles of the present invention is that high vertical frequency content is equivalent to high vertical detail. Again, this relationship is true for horizontal detail as well. Information with high frequency content is likely to be text; however, what really makes the distinction is that high frequency content is also indicative of high contrast. This fact is taken advantage by the contrast detector 124 of the present invention. By detecting high frequency content, the presence of areas of high contrast in the image may also be deduced. Again, the relationship between the amount of aperture correction needed and the frequency content is not a linear relationship, which is why the contrast detector 124 preferably employs non-linear transforms in its circuitry to adjust the aperture correction.

Noise has a wide frequency distribution and typically adds small values to each luminance level so that if a pair of adjacent pixels in two vertical lines have the values P1L1=101, P1L2=103, the difference will be DIFF=2, but if one pixel is changed by noise to P1L2=105, then DIFF=4 and thus have an impact on the contrast detector's performance. "Impulsive" noise is noise which has high contrast, and may make a pixel appear completely white or black. Impulsive noise is usually encountered in satellite transmissions. As discussed above in the preferred embodiment, the video signal is coming from a graphics accelerator, and is likely to only have low amplitude noise, and therefore not add much 'contrast' between pixels.

The contrast detector 124 may also be implemented as a look-up table stored in a memory coupled to a central processing unit. In this embodiment a contrast detection module implementing the look up table receives the output of the high pass filter 116, and accesses the table to determine the amount of contrast detection needed based upon the table. Thus, in this embodiment, the circuitry of FIG. 5a does not have to be implemented, saving on hardware costs. However, the module implementation may be significantly slower than the hardware implementation. The values of the look-up table can be determined by simply processing values through the function of FIG. 5b. The input values are values ranging from 0 to 255, which are the possible amplitudes in a typical system implementing the present invention Then, when an input value is received from the filter, the matching input value is found, and the resultant value can be immediately accessed from the table and transmitted to the aperture correction circuit 112.

Additionally, in a software embodiment in accordance with the present invention, the parameter N and Offset may be set by values loaded into registers coupled to the contrast detector 124, as shown in FIG. 1. In this embodiment, the values loaded into the registers are set by a user through a graphical user interface. In a preferred embodiment, the graphical user interface displays a button or knob for selecting "sharpness." By manipulating the button or knob image, the user modifies the N and/or Offset values of the non-linear transfer function. By varying the N or Offset parameters, the user is able to alter the shape of the curve, thus tailoring the contrast detector for the image currently being displayed to the user. After repeated use, the user is able to choose a specific setting which appears to process images in an optimal manner, and leave the settings alone. Or, if varied types of images are received in a system, a user may store specific curves that may be retrieved and applied when one of the types of images are being displayed. For example, if a user determines by adjusting the interface knob and varying the N and Offset parameters that curve 522 optimizes images having a significant amount of text, then the user may save the curve 522 settings on the system. The user may then determine by adjusting the interface knob that curve 524 optimizes video images having nature scenery. This setting may also be stored on the system. Then, when the user is viewing text images at a later time, the user can recall the saved setting which implements curve 522, and when the user next views a nature video, the user can retrieve the settings which implement curve 524. This is a useful feature because individual users have individual preferences as to how much aperture correction they require before an image appears correct to them, and the software allows the user to tailor the aperture correction processing for the user's tastes.

Referring back to FIG. 1, the dynamic value 117 of aperture correction is sent to a multiplexer 140 which selects either fixed aperture correction or the dynamic value 117. The selection is determined by a selection signal (Se1) provided by a user. The output 142 of the multiplexer 140 is sent to aperture correction circuit 112. The fixed value (Fixed PC) uses preset thresholds, such as Ac1, Acm, Ach discussed above. This allows the user more flexibility in choosing to use a fixed amount of aperture correction or dynamic aperture correction. Aperture correction circuit 112 then applies the value 142 in a manner detailed above and the signal 180 is transmitted to the display 170. Alternatively the signal 180 may be stored to a frame buffer memory or be further processed.

Figure 6:
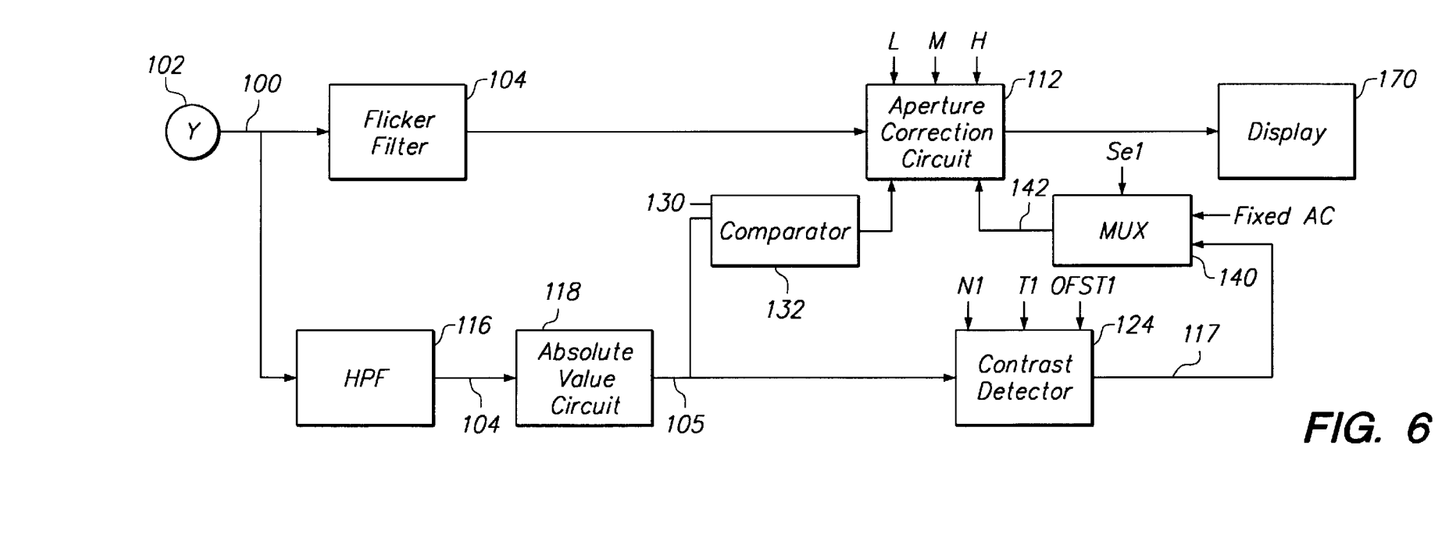
FIG. 6 is a block diagram of an embodiment of the present invention with a global threshold detector.

In a preferred embodiment of the present invention, the aperture correction circuit 112 can be turned on or off depending on a global threshold detector 132 that has as its input the absolute value of the high pass filter 116. As shown in FIG. 6, in this embodiment, the signal 104 after it has been filtered is sent to an absolute value circuit 118 to avoid having negative signals transmitted to the threshold comparator 132. The output 105 of the absolute value circuit 118, is transmitted to the threshold comparator 104. This value 105 is compared to the global threshold value 130. If the value of the input signal 105 is greater than the threshold 130, the aperture correction circuit 112 is enabled. If the value 105 is less, the aperture correction circuit 112 is disabled.

A significant benefit provided by the embodiment of FIG. 6 is that absolute vertical detail gives a rough indication of high energy text or graphics edges only when the vertical detail exceeds a certain value specified by the threshold 130. For high vertical detail which is less than the global threshold 130, the system assumes that these are details more likely to occur in natural textures such as wood or human faces. In these textures the luminance detail is similar for adjacent pixels, and therefore these areas do not need aperture correction. In the shirt example of FIG. 3d, the signal would have sharp transitions at the edges, and therefore the contrast detector 124 would detect the edges of the shirts. However, the noise and minor fluctuations in the shirt image would not be enhanced, as they would not have enough high contrast vertical picture detail to exceed the global threshold 130. Typically, the value set for the global threshold is low, such as a threshold between 8 and 16 (out of 256.) The threshold is low because in most cases the users will want some aperture correction added to their images.

In a further aspect of the present invention, areas of an image that transition from light to dark can also be enhanced. This is called inverse aperture correction, and it is applicable when the Ydiff signed 104 has a negative value. An image going from white to black is going from a high value of luminance to a low value of luminance. An image going from black to white is going from a low value of luminance to a high value of luminance. Both may be sharp transitions, and therefore both may need aperture correction, but the aperture correction for each will be different.

Figure 7:
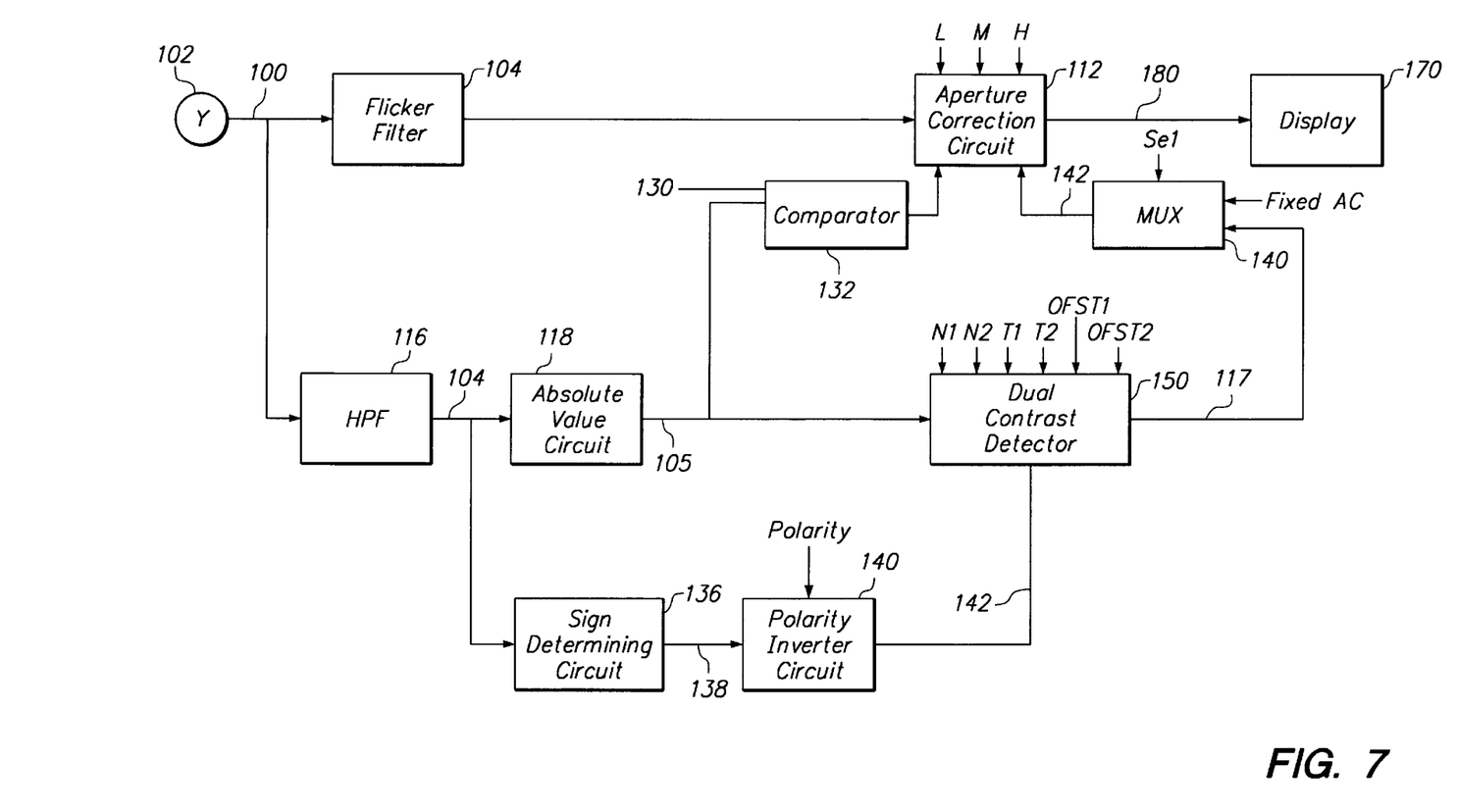
FIG. 7 is a block diagram of an embodiment of the present invention with a dual contrast detector 150 in accordance with the present invention.

In this embodiment, a dual contrast detector 150 is employed comprising two contrast detectors 124, 128, one to process positive values and one to process negative values. As shown in FIG. 7, Ydiff 104 is analyzed to determine whether it has a negative or positive value by a sign determining circuit 136. The sign determining circuit 136 is simply a comparator having zero as one input and Ydiff 104 is the other. If Ydiff 104 is greater than or equal to zero, a first value is transmitted. If Ydiff 104 is less than zero, a second value is transmitted. The output 138 of the sign determining circuit 136 is preferably transmitted to a polarity inverter 140. The polarity inverter 140 is implemented to provide external control over whether a positive Ydiff 104 is transmitted to the first contrast detector 124 or the second contrast detector 128. For example, the polarity inverter 140 may be designed to transmit a positive Ydiff 104 to the first contrast detector 124 in response to a binary zero, and a negative Ydiff 104 to the second contrast detector 128 in response to a binary one. The user may have a preference based upon performance, and this circuit 140 allows the user the flexibility to choose.

The polarity inverter 140 generates a select contrast detector signal 142 based upon the polarity selected and the signal 138 received from the sign determining circuit. In the above example, if a negative Ydiff 138 is received, a binary zero 142 is transmitted to the dual contrast detector 150, which selects the output of its second contrast detector 128. If a positive Ydiff is received, a binary one is transmitted to the dual contrast detector 150, which selects the output of the first contrast detector 124.

Figure 8:
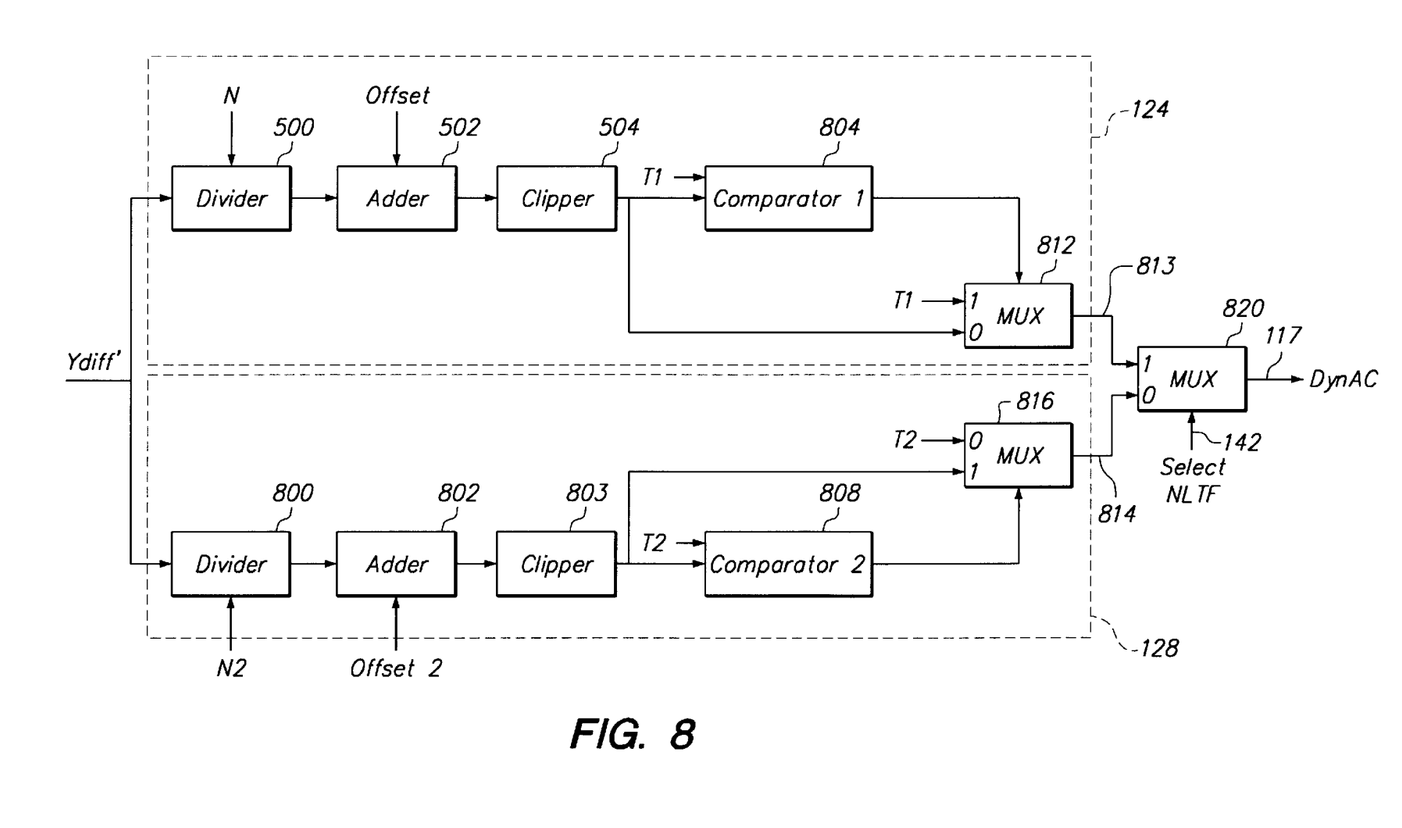
FIG. 8 is a block diagram of an embodiment of the dual contrast detector 150 of FIG. 7.

FIG. 8 shows further details of dual contrast detector 150 employing two contrast detectors 124, 128 in accordance with the principles of the present invention. The absolute value of Ydiff is transmitted to both contrast detectors 124, 128. After being processed by divider 500, adder 502, clipper 504 circuitry as described above in connection with FIG. 5a, the signals are transmitted to the comparators 804, 808 and multiplexers 812, 816 which transmit the proper dynamic aperture correction signals 813, 814 as described above. However, a third multiplexer 820 receives the two dynamic aperture correction signals 813, 814 generated from the two contrast detectors 124, 128 and selects one or the other based upon the select contrast detector signal 142 described above. The contrast detector 128 for the inverse aperture correction implements a non-linear function which is different from the one used for forward aperture correction. This is due to the fact that the human eye responds to white to black transitions differently than it does to black to white transitions. Therefore, a circuit implementing a curve with a flatter slope and a lower threshold than the circuit used for forward aperture correction is sued for inverse aperture correction.

Figure 9:
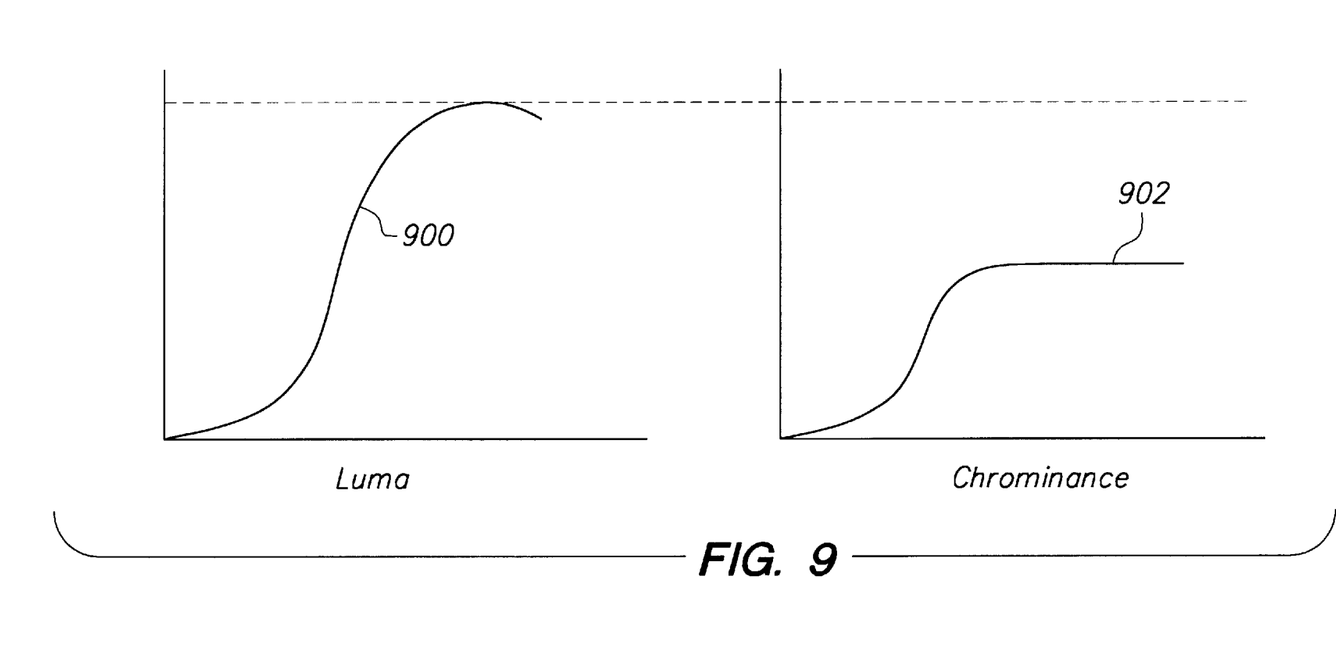
FIG. 9 is a graph of a non-linear transfer function in vertical detail vs. aperture correction for the chrominance embodiment of the present invention.

The principles of the present invention can also be applied to chrominance data. Adjusting the chrominance value of a system results in adjusting of the amount of color contrast the viewer will see. Thus, a red image on a blue background will have a sharper edge contrast. However, minor fluctuations in the red image will not be enhanced in accordance with the present invention. The circuitry needed to implement dynamic adaptive aperture correction on the chrominance component of the signal will be similar to the circuitry described in FIG. 1 with the differences explained herein. Separate circuits are needed to process the U and V components of the chroma signal. The nonlinear transfer function to process chroma is slightly different than the one used to process luminance, as shown in FIG. 9. The shape of the curve 902 is different from the luminance curve 901, as well as the location of the threshold 507 where the maximum value of aperture correction is applied. Chroma processing typically requires smaller values of aperture correction than luminance and therefore the threshold 507 is lower than the luminance threshold 507. The non-linear transfer function for chrominance is implemented by circuitry similar to the circuitry used to implement the luminance transfer function described above in FIG. 5a.

One of advantages of the present invention is that if aperture correction is applied to the correct signal transitions, it will allow the system to use smaller flicker filters 108, for instance 2 or 3 taps. The alternative is to use a much higher number of taps for more frequency selectivity and therefore achieve less attenuation of the sharp edges of text. Only a perfect digital filter will be able to have the selectivity needed to implement an ideal low pass filter. However, even higher order flicker filter implementation benefits from the adaptive Aperture Correction approach since a sharp edge is affected by any kind of low pass filtering. It is to be understood that the specific mechanisms and techniques, discussed herein are merely illustrative of exemplary applications of the principles of the invention. Numerous modifications may be made to the methods and apparatus described without departing from the true spirit and scope of the invention.

What is claimed is:

1. An apparatus for dynamically applying aperture correction coupled to an aperture correction circuit to enhance an input signal containing graphics data, comprising:
 a high pass filter, coupled to the input signal for passing only a high frequency component of the signal; and
 a contrast detector, coupled to the high pass filter and the aperture correction circuit, for producing a control signal controlling the amount of aperture correction to be added to a flicker filtered version of the input signal by the aperture correction circuit, in response to an amount of contrast present in the high frequency component of the signal transmitted by the filter.

2. The apparatus of claim 1 wherein the high pass filter divides the high frequency component of the signal into a signal containing positive going frequencies and a signal containing negative going frequencies; and the contrast detector is coupled to the signal containing positive going frequencies, and generates a control signal in response to the amount of contrast present in the signal containing positive going frequencies.

3. The apparatus of claim 1, further comprising:

a second contrast detector, coupled to the negative output of the high pass filter for detecting high contrast picture information in the signal and producing a control signal that determines an amount of inverse aperture correction that will be added by the aperture correction circuit to a flicker filtered version of the signal.

4. The apparatus of claim 1, further comprising:

a global threshold detector, coupled to the high pass filter, for enabling the aperture correction circuit in response to the amplitude of the input signal exceeding a threshold.

5. The output of claim 4 wherein the global threshold is set by a user of the system.

6. The apparatus of claim 1, wherein a modified input signal is transmitted to the high pass filter comprising only the luminance characteristics of the signal, and wherein the contrast detector determines the amount of luminance to be added or subtracted to the input signal.

7. The apparatus of claim 6, wherein the modified input signal comprises only the chrominance characteristics of the signal, and wherein the contrast detector determines the amount of chrominance to be added or subtracted to the signal.

8. The apparatus of claim 1 wherein there are a plurality of flicker filters coupled to the input signal in parallel with each other and the high pass filter, wherein one of the plurality is selected to perform the flicker filtering.

9. The apparatus of claim 1 wherein the high pass filter is a vertical high pass filter for processing only vertical picture detail.

10. The apparatus of claim 9 wherein the vertical high pass filter has characteristics of [½, -½].

11. The apparatus of claim 1 wherein the high pass filter further comprises:

a line buffer, having an input coupled to the input signals for delaying the transmission of a line and an output; and a subtractor, having a first input coupled to the output of the line buffer and a second input coupled to the input signal, and having an output coupled to the contrast detector, for subtracting the output of the line buffer from the input signal to create a filtered signal.

12. The apparatus of claim 1 wherein the contrast detector is a circuit implementing a non-linear transfer function.

13. The apparatus of claim 1 wherein the signal received from the high pass filter has an amplitude, and the contrast detector comprises a memory for storing a table indexing output values for a non-linear transfer function generated in response to amplitudes ranging from 0 to 255.

14. The apparatus claim of 12 wherein the control signal is generated in accordance with the function: Aperture Correction=Ydiff/N+Offset; where Ydiff is the absolute value of the input signal, N is a constant chosen to control the rate at which aperture correction is applied, and the offset is chosen to set the minimum amount of aperture correction to apply.

15. The apparatus of claim 14 wherein the Offset and N values are selectable.

16. The apparatus of claim 12, wherein the non-linear transfer function implemented by the circuit detects text information in the input signal.

17. The apparatus of claim 12, wherein the circuit implementing the non-linear transfer function comprises:

a divider, coupled to the high pass filter and a constant value, for dividing the output of the high pass filter by the constant value, where the constant determines a rate at which aperture correction is applied;

an adder, coupled to the divider and an offset value, for adding the offset value to the output of the divider where the offset value sets the minimum amount of aperture correction that can be applied;

a clipper, coupled to the adder, for clipping off negative components of the signal transmitted from the adder;

a comparator, coupled to a threshold value and the clipper, for generating a control signal in response to the difference between the value of the signal transmitted by the clipper and the value of the threshold, where the threshold value is chosen as the maximum amount of aperture correction to apply; and a multiplexer, coupled to the threshold value, the output of the clipper, and the output of the comparator, for transmitting either the threshold or the output of the clipper in response to the control signal transmitted by the comparator.

18. The apparatus of claim 17 wherein the input signal is for display on a display in a computer system, and the offset value is selected by a user of the computer system to characterize the types of images generated in the computer system.

19. The apparatus of claim 1, wherein the high pass filter is for processing only horizontal picture detail.

20. The apparatus of claim 1, wherein the aperture correction circuit is located on the same device as the high pass filter and the contrast detector.

21. The apparatus of claim 1 further comprising:

a multiplexer, coupled to a fixed aperture correction value and the output of the contrast detector, for transmitting either the fixed value of the contrast detector output in response to a selection signal to the aperture correction circuit.

22. A method for dynamically adding aperture correction to a signal containing graphics data, comprising the steps of:

filtering out the low frequency component of the signal;

detecting areas of high picture detail in the filtered signal; and adding picture detail back to the detected areas of a flicker-filtered version of the signal responsive to the amount of picture detail detected.

23. An apparatus for improving an image for display on a computer system comprising:

a data source, for producing image data;

a high pass filter, coupled to the data source, for filtering out low frequency components of the image data and creating a high-frequency image signal;

a flicker filter, coupled to the data source, for removing flicker artifacts from the image data and creating a flicker-filtered version of the image data;

a contrast detector, coupled to the high pass filter, for detecting contrast in the high frequency image signal and producing a value of aperture correction to be added to the image data; and an aperture correction circuit, coupled to the flicker filter and the contrast detector, for adding aperture correction to the flicker-filtered version of the image data in response to the value received from the contrast detector.

* * * * *